US012536326B2

(12) United States Patent
Williams et al.

(10) Patent No.: US 12,536,326 B2
(45) Date of Patent: Jan. 27, 2026

(54) METHOD AND SYSTEM OF COMPUTER-AUTOMATED DETECTION OF PERSONALLY IDENTIFIABLE DATA IN ELECTRONIC DATA

(71) Applicant: JPMorgan Chase Bank, N.A., New York, NY (US)

(72) Inventors: Stephen Williams, Westerville, OH (US); John C Hecker, Sunbury, DE (US); Anthony L Day, Flower Mound, TX (US)

(73) Assignee: JP Morgan Chase Bank, N.A., New York, NY (US)

( * ) Notice: Subject to any disclaimer, the term of this patent is extended or adjusted under 35 U.S.C. 154(b) by 102 days.

(21) Appl. No.: 18/746,699

(22) Filed: Jun. 18, 2024

(65) Prior Publication Data
US 2025/0384158 A1 Dec. 18, 2025

(51) Int. Cl.
*G06F 21/00* (2013.01)
*G06F 11/3698* (2025.01)
*G06F 21/60* (2013.01)
*G06F 21/62* (2013.01)

(52) U.S. Cl.
CPC ...... *G06F 21/6245* (2013.01); *G06F 11/3698* (2025.01); *G06F 21/602* (2013.01)

(58) Field of Classification Search
None
See application file for complete search history.

(56) References Cited

U.S. PATENT DOCUMENTS

| | | | |
|---|---|---|---|
| 11,244,156 B1* | 2/2022 | Lakshman | G06F 16/9014 |
| 2004/0128552 A1* | 7/2004 | Toomey | G06F 21/57 |
| | | | 726/22 |
| 2015/0026181 A1* | 1/2015 | Milton | G06F 16/2379 |
| | | | 707/736 |
| 2020/0004980 A1* | 1/2020 | Blass | G06F 16/2465 |
| 2023/0134781 A1* | 5/2023 | Senerth | G06F 21/6227 |
| | | | 726/26 |
| 2023/0236881 A1* | 7/2023 | Saliba | G06F 9/4806 |
| | | | 718/102 |
| 2023/0306131 A1* | 9/2023 | Le Bouthillier | H04L 9/0643 |
| 2024/0069752 A1* | 2/2024 | Erb | G06F 21/6254 |
| 2024/0146846 A1* | 5/2024 | Swerdlow | G10L 15/10 |
| 2025/0007949 A1* | 1/2025 | Fennell | H04L 9/50 |

* cited by examiner

*Primary Examiner* — Shin-Hon (Eric) Chen
(74) *Attorney, Agent, or Firm* — Greenblum & Bernstein, P.L.C.

(57) ABSTRACT

A method and system of computer-automated detection of personally identifiable (PI) data in electronic data are provided. The method includes: receiving the electronic data including the PI data and transmitting the electronic data to a modifiable hash algorithm in a first computing environment. The method further includes generating, by the modifiable hash algorithm, hashed electronic data via masking the PI data; comparing, by a PI detector service function algorithm in a second computing environment, first electronic data fields of the received electronic data including the PI data with second electronic data fields of the hashed electronic data including the masked PI data in order to detect a match indicating a presence of unmasked PI data between the first and second electronic data fields; generating, by the PI detector service function algorithm, a result with a confidence level based on the comparison; and outputting the result with the confidence level.

13 Claims, 8 Drawing Sheets

```
Sample hash file:
0010000494    ACHM    TYPE.ACCT          0000000000000110012000000000113399....
0010000494    MF11    PRML-ADDR1         ).Q.1..ºE¹"..2>5.ä:.uqyA¦X¦cV.o....
0010000494    MF11    PRML-ADDR2         0000000000000110012000000020116979....
0010000494    MF11    PRML-DOB           0000000000000110012000000020116985....
0010000494    MF11    PRML-EMAIL         0000000000000110012000000020116984....
0010000494    MF11    PRML-NAME          ..ºf.9nÑ jé¬.k.²dþ¡.Üê<¿¡.Ü.fYJ%....
0010000494    MF11    PRML-PHONE-BUS     0000000000000110012000000020116981....
0010000494    MF11    PRML-PHONE-CELL    0000000000000110012000000020116982....
0010000494    MF11    PRML-PHONE-RES     0000000000000110012000000020116980....
0010000494    MF11    PRML-SSN           0000000000000110012000000020116983....
0010000495    MF11    COL1-ADDR1         AîaY1...Pí..#  .Z.P..võæa.AyJ.yÜM....
0010000494    MF17    0C950001           0000000000000110012000000022637358....
0010000494    MF17    0C950001           0000000000000110012000000022637362....
0010000494    MF17    0C960005           0000000000000110012000000022637360....
0010000494    MF17    0C960005           0000000000000110012000000022637364....
0010000494    MF17    3C950001           0000000000000110012000000022637359....
0010000494    MF17    3C950001           0000000000000110012000000022637363....
0010000494    MF17    3C960005           0000000000000110012000000022637361....
0010000494    MF17    3C960005           0000000000000110012000000022637365....
0010000494    MF20    POFF               M.a./ß....¬"v.bs¡@.¥Y"...z-.¢.þ¬....
              ↑                ↑                               ↑
             802              803                             804
↑
801
```

FIG. 8

METHOD AND SYSTEM OF COMPUTER-AUTOMATED DETECTION OF PERSONALLY IDENTIFIABLE DATA IN ELECTRONIC DATA

BACKGROUND

1. Field of the Disclosure

This technology generally relates to methods and systems computer-automated detection of personally identifiable (PI) data in electronic data by detecting a presence of unmasked PI data between electronic data fields in different computing environments.

2. Background Information

Personally identifiable (PI) data are frequently present in computing environments. While PI data is necessary for identification purposes, there exists a strong need to protect PI data from unwarranted exposure and to detect whether such exposure has occurred. Specifically, there exists a need to automatically detect the presence of PI data in a computing environment where it is unwarranted for the PI data to be present in. For instance, PI data should not be present in developer or software test computing environments. However, PI data can be present in computing environments related to customer interactions, human resources, etc.

Typically, the process of such detection is tedious and time-consuming and involves scouring the different computing environments individually to determine if there may be PI data present within unauthorized computing environments, i.e., if there may be a breach between the barriers of different computing environments. Accordingly, there is a need for techniques to automate the detection of PI data between different computing environments, i.e., if there may be a breach between the barriers of different computing environments such that the presence of the PI data may be detected within unauthorized computing environments.

SUMMARY

The present disclosure, through one or more of its various aspects, embodiments, and/or specific features or sub-components, provides, inter alia, various systems, servers, devices, methods, media, programs, and platforms for computer-automated detection of personally identifiable (PI) data in electronic data.

According to an aspect of the present disclosure, a method of computer-automated detection of personally identifiable (PI) data in electronic data is provided. The method may be implemented by at least one processor. The method may include: receiving, in a first computing environment, electronic data comprising PI data; transmitting the electronic data comprising the PI data to a modifiable hash algorithm in the first computing environment; generating, by the modifiable hash algorithm, hashed electronic data via masking the PI data in the electronic data; comparing, by a PI detector service function algorithm in a second computing environment, first electronic data fields of the received electronic data comprising the PI data with second electronic data fields of the hashed electronic data comprising the masked PI data in order to detect a match indicating a presence of unmasked PI data between the first and second electronic data fields; generating, by the PI detector service function algorithm, a result with a confidence level based on the comparison; and outputting the result with the confidence level.

The generating of hashed electronic data may include: converting non-readable values in the electronic data comprising the PI data into spaces; deleting leading spaces and trailing spaces in the electronic data comprising the PI data; normalizing uppercase letters to lowercase letters in the electronic data comprising the PI data; converting mainframe format values in the electronic data comprising the PI data to standard encoding format values for electronic communication; compiling an electronic data file of the electronic data comprising the PI data based on the converting, deleting, normalizing, and converting; and transforming the compiled electronic data file of the electronic data comprising the PI data via the masking of the PI data in the electronic data with randomized text strings of characters, letters, and symbols, resulting in a one-way encryption of the PI data of the electronic data.

The mainframe format values may comprise Extended Binary Coded Decimal Interchange Code (EBCDIC) format values.

The standard encoding format values for electronic communication may comprise American Standard Code for Information Interchange (ASCII) format values.

The PI data may include at least one from among: a name, an address, a date of birth, a social security number, a tax identification, an email address, account information, and biometric data comprising at least one from among a facial image scan and fingerprints. Wherein the account information may include at least one from among: a bank account number, a savings account number, a financial account number, an origination account number, a servicing account number, an operational reporting account number, an analytical account number, a loan account number, a money market account number, a credit card account number, and an investment account number.

The first computing environment may denote a production computing environment comprising at least one from among: a computing environment of a branch of a financial institution, a computing environment of a website associated with the financial institution, and a computing environment of a mobile application associated with the financial institution. The second computing environment may denote a non-production computing environment comprising at least one from among a developer test environment and a software test environment.

The modifiable hash algorithm may be a cryptographic secure hash algorithm (SHA) being modifiable with rules associated with at least one from among: data conversion rules, data normalization rules, data transformation rules, data mapping rules, data translation rules, and data deletion rules.

The method may further include: inputting the result into a data aggregator algorithm; and outputting, by the data aggregator algorithm, a report based on the result with the confidence level based on the comparison with the match indicating the detected presence of the unmasked PI data. Wherein the outputted report is displayed on a user interface and the report comprises at least one from among a generated event, a generated alert, a generated auto-remediation action, and a generated data set utilized in training an artificial intelligence (AI) model.

The data aggregator algorithm may include at least one rule from among: PI rules, payment card industry rules, corporate information rules, California Consumer Privacy Act (CCPA) rules, General Data Protection Regulation (GDPR) rules, and data privacy rules.

The method may further include: implementing an artificial intelligence (AI) model comprising a reinforcement algorithm; training the AI model with the electronic data comprising the PI data, the hashed electronic data comprising the masked PI data, the match detection indicating the presence of the unmasked PI data, the comparison of the first electronic data fields of the received electronic data comprising the PI data with the second electronic data fields of the hashed electronic data comprising the masked PI data, and the result with the confidence level; evaluating, by the trained AI model, an operational performance of the PI detector service function algorithm in detecting the match indicating the presence of the unmasked PI data; and updating, based on the trained AI model, the operational performance of the PI detector service function algorithm in detecting the match indicating the detected presence of the unmasked PI data.

The method may further include upon the outputting the result with the confidence level showing that the detecting of the match indicates the presence of the unmasked PI data between the first and second electronic data fields, eliminating, by the PI detector service function algorithm, the presence of the unmasked PI data between the first and second electronic data fields via the masking of the unmasked PI data with the randomized text strings of characters, letters, and symbols.

According to another embodiment, a computing apparatus implementing a computer-automated detection of personally identifiable (PI) data in electronic data is provided. The computing apparatus may include: a processor; a memory; a display; and a communication interface coupled to each of the processor, the memory, and the display. The processor may be configured to: receive, within a first computing environment, electronic data comprising PI data; transmit the electronic data comprising the PI data to a modifiable hash algorithm in the first computing environment; generate, by the modifiable hash algorithm, hashed electronic data via masking the PI data in the electronic data; compare, by a PI detector service function algorithm in a second computing environment, first electronic data fields of the received electronic data comprising the PI data with second electronic data fields of the hashed electronic data comprising the masked PI data in order to detect a match indicating a presence of unmasked PI data between the first and second electronic data fields; generate, by the PI detector service function algorithm, a result with a confidence level based on the comparison; and output the result with the confidence level.

The processor may be configured to perform the generate of the hashed electronic data by: converting non-readable values in the electronic data comprising the PI data into spaces; deleting leading spaces and trailing spaces in the electronic data comprising the PI data; normalizing uppercase letters to lowercase letters in the electronic data comprising the PI data; converting mainframe format values in the electronic data comprising the PI data to standard encoding format values for electronic communication; compiling an electronic data file of the electronic data comprising the PI data based on the converting, deleting, normalizing, and converting; and transforming the compiled electronic data file of the electronic data comprising the PI data via the masking of the PI data in the electronic data with randomized text strings of characters, letters, and symbols, resulting in a one-way encryption of the PI data of the electronic data.

The processor may further be configured to: implement an artificial intelligence (AI) model comprising a reinforcement algorithm; train the AI model with the electronic data comprising the PI data, the hashed electronic data comprising the masked PI data, the match detection indicating the presence of the unmasked PI data, the comparison of the first electronic data fields of the received electronic data comprising the PI data with the second electronic data fields of the hashed electronic data comprising the masked PI data, and the result with the confidence level; evaluate, by the trained AI model, an operational performance of the PI detector service function algorithm in detecting the match indicating the presence of the unmasked PI data; and update, based on the trained AI model, the operational performance of the PI detector service function algorithm in detecting the match indicating the detected presence of the unmasked PI data.

The processor may further be configured to: upon the outputting the result with the confidence level showing that the detecting of the match indicates the presence of the unmasked PI data between the first and second electronic data fields, eliminating, by the PI detector service function algorithm, the presence of the unmasked PI data between the first and second electronic data fields via the masking of the unmasked PI data with the randomized text strings of characters, letters, and symbols.

The processor may further be configured to: input the result into a data aggregator algorithm; and output, by the data aggregator algorithm, a report based on the result with the confidence level of the comparison with the match indicating the detected presence of the unmasked PI data. The outputted report is displayed on a user interface and the report comprises at least one from among a generated event, a generated alert, a generated auto-remediation action, and a generated data set utilized in training an artificial intelligence (AI) model. The first computing environment denotes a production computing environment comprising at least one from among: a computing environment of a branch of a financial institution, a computing environment of a website associated with the financial institution, and a computing environment of a mobile application associated with the financial institution. The second computing environment denotes a non-production computing environment comprising at least one from among a developer test environment and a software test environment.

According to yet another embodiment, non-transitory computer readable storage medium storing instructions for computer-automated detection of personally identifiable (PI) data in electronic data is provided. The non-transitory computer readable storage medium comprising executable code which, when executed by a processor, causes the processor to: receive, within a first computing environment, electronic data comprising PI data; transmit the electronic data comprising the PI data to a modifiable hash algorithm in the first computing environment; generate, by the modifiable hash algorithm, hashed electronic data via masking the PI data in the electronic data; compare, by a PI detector service function algorithm in a second computing environment, first electronic data fields of the received electronic data comprising the PI data with second electronic data fields of the hashed electronic data comprising the masked PI data in order to detect a match indicating a presence of unmasked PI data between the first and second electronic data fields; generate, by the PI detector service function algorithm, a result with a confidence level based on the comparison; and output the result with the confidence level In an embodiment, the storage medium comprising the executable code which, when executed by the processor, causes the processor to implement the generate of the hashed electronic data by: converting non-readable values in the electronic data comprising the PI data into spaces; deleting leading spaces and trailing spaces in the electronic data comprising the PI data; normalizing uppercase letters to lowercase letters in the electronic data comprising the PI data; converting mainframe format values in the electronic data comprising the PI data to standard encoding format values for electronic communication; compiling an electronic data file of the electronic data comprising the PI data based on the converting, deleting, normalizing, and converting; and transforming the compiled electronic data file of the electronic data comprising the PI data via the masking of the PI data in the electronic data with the randomized text strings of characters, letters, and symbols.

In an embodiment, the storage medium comprising the executable code which, when executed by the processor, causes the processor to further: implement an artificial intelligence (AI) model comprising a reinforcement algorithm; train the AI model with the electronic data comprising the PI data, the hashed electronic data comprising the masked PI data, the match detection indicating the presence of the unmasked PI data, the comparison of the first electronic data fields of the received electronic data comprising the PI data with the second electronic data fields of the hashed electronic data comprising the masked PI data, and the result with the confidence level; evaluate, by the trained AI model, an operational performance of the PI detector service function algorithm in detecting the match indicating the presence of the unmasked PI data; and update, based on the trained AI model, the operational performance of the PI detector service function algorithm in detecting the match indicating the detected presence of the unmasked PI data.

In an embodiment, the storage medium comprising the executable code which, when executed by the processor, causes the processor to further: input the result into a data aggregator algorithm; and output, by the data aggregator algorithm, a report based on the result with the confidence level of the comparison with the match indicating the detected presence of the unmasked PI data. The outputted report is displayed on a user interface and the report comprises at least one from among a generated event, a generated alert, a generated auto-remediation action, and a generated data set utilized in training an artificial intelligence (AI) model. The first computing environment denotes a production computing environment comprising at least one from among: a computing environment of a branch of a financial institution, a computing environment of a website associated with the financial institution, and a computing environment of a mobile application associated with the financial institution. The second computing environment denotes a non-production computing environment comprising at least one from among a developer test environment and a software test environment.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 8 shows a sample hash file according to an embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
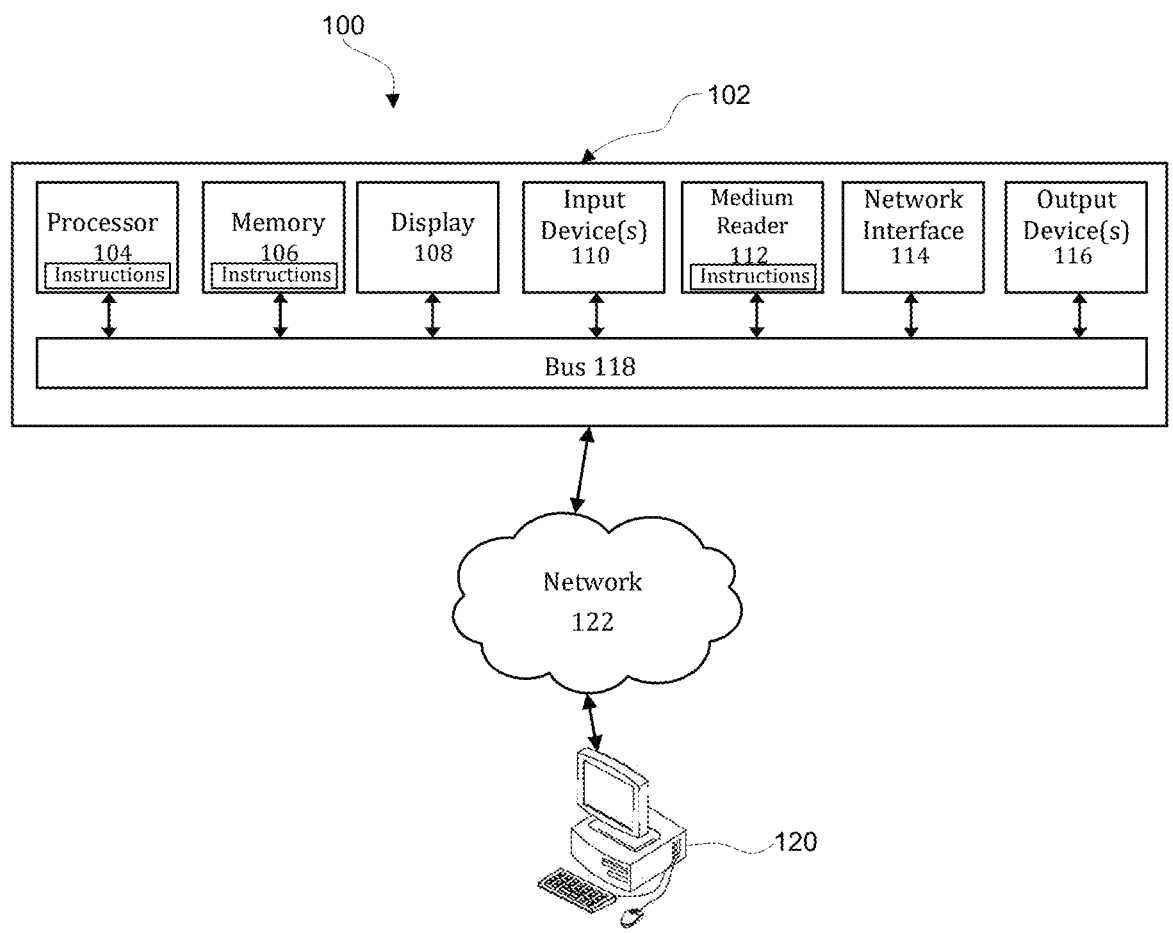
FIG. 1 illustrates a system diagram of a computer system.

FIG. 1 illustrates a system 100 diagram of a computer system 102 for use in accordance with the embodiments described herein. The system 100 may be generally shown and may include a computer system 102, which may be generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 may be illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 can be an article of manufacture and/or a machine component. The processor 104 may be configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray® disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed input devices 110 are not meant to be exhaustive and that the computer system 102 may include any additional, or alternative, input devices 110.

The computer system 102 may also include a medium reader 112 which may be configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but not limited to, a local area network, a wide area network, the Internet, a telephony network, a short-range network, or any other network commonly known and understood in the art. The short-range network may include, for example, Bluetooth®, Zigbee®, infrared, near field communication, ultra-wideband, or any combination thereof. Those skilled in the art appreciate that additional networks 122 which are known and understood may additionally or alternatively be used and that the networks 122 are not limiting or exhaustive. Also, while the network 122 may be illustrated in FIG. 1 as a wireless network, those skilled in the art appreciate that the network 122 may also be a wired network.

The additional computer device 120 may be illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that may be capable of executing a set of instructions, sequential or otherwise, that specify actions to be taken by that device. Of course, those skilled in the art appreciate that the above-listed devices are merely examples of devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be examples and are not intended to be exhaustive and/or inclusive. Furthermore, the examples of the components listed above are also similarly not meant to be exhaustive and/or inclusive.

In accordance with various embodiments of the present disclosure, the methods described herein may be implemented using a hardware computer system that executes software programs. Further, in a non-limiting embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for computer-automated detection of personally identifiable (PI) data in electronic data by detecting a presence of unmasked PI data between electronic data fields in different computing environments.

Figure 2:
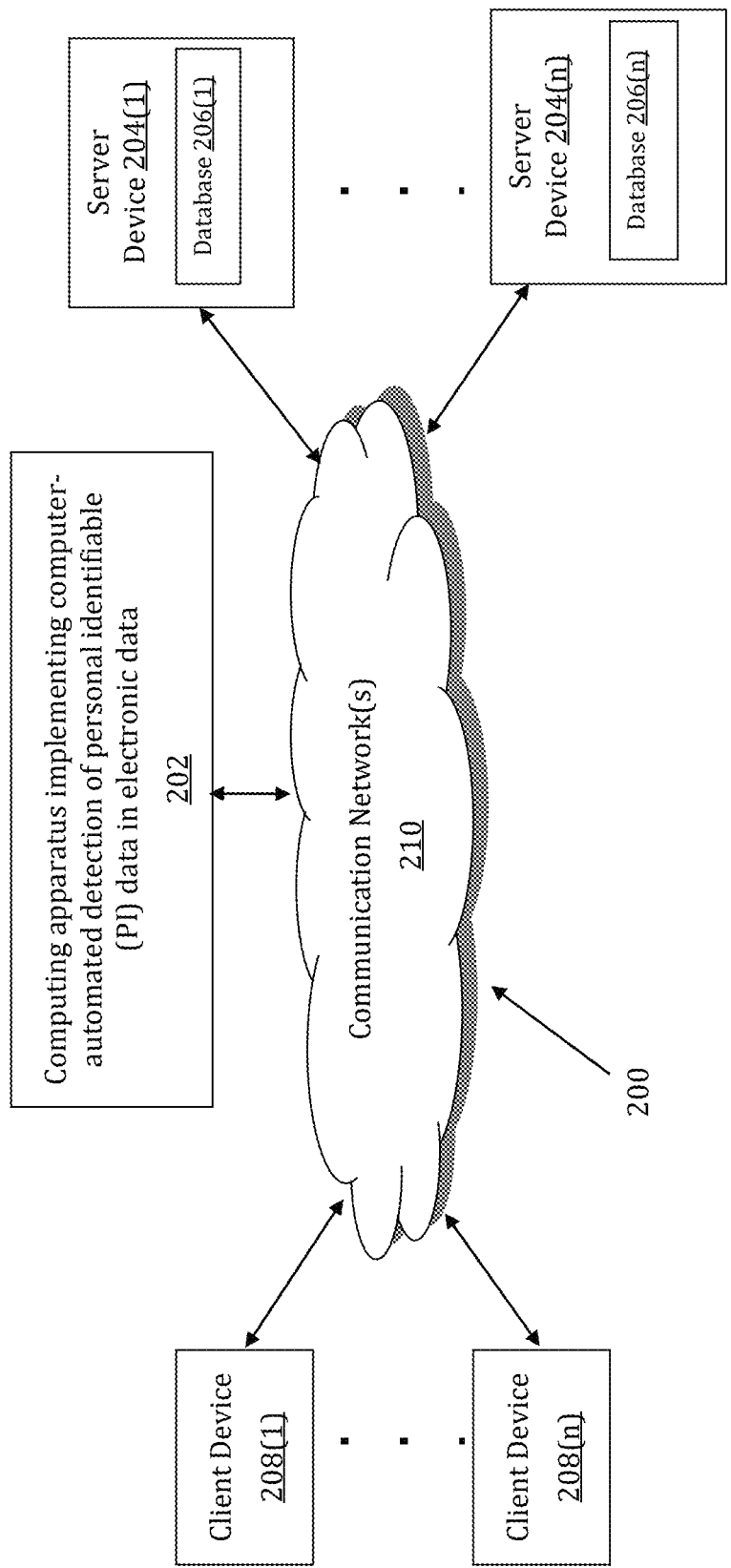
FIG. 2 illustrates a network diagram of a network environment.

Referring to FIG. 2, FIG. 2 illustrates a network diagram of a network environment 200 for implementing a method of computer-automated detection of personally identifiable (PI) data in electronic data by detecting a presence of unmasked PI data between electronic data fields in different computing environments may be illustrated. In an embodiment, the method may be executable on any networked computer platform, such as, for example, a personal computer (PC).

The method for computer-automated detection of personally identifiable (PI) data in electronic data by detecting a presence of unmasked PI data between electronic data fields in different computing environments may be implemented by a computing apparatus 202 that implements the computer-automated detection of personally identifiable (PI) data in electronic data by detecting a presence of unmasked PI data between electronic data fields in different computing environments. The computing apparatus 202 may be the same or similar to the computer system 102 as described with respect to FIG. 1. The computing apparatus 202 may store one or more applications that can include executable instructions that, when executed by the computing apparatus 202, cause the computing apparatus 202 to perform actions, such as to transmit, receive, or otherwise process network messages, for example, and to perform other actions described and illustrated below with reference to the figures.

The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s) may be located in virtual server(s) running in a cloud-based computing environment rather than being tied to one or more specific physical network computing devices. Also, the application(s) may be running in one or more virtual machines (VMs) executing on the computing apparatus 202. Additionally, in one or more embodiments of this technology, virtual machine(s) running on the computing apparatus 202 may be managed or supervised by a hypervisor.

In the network environment 200 of FIG. 2, the computing apparatus 202 may be coupled to a plurality of server devices 204(1)-204(n) that hosts a plurality of databases 206(1)-206(n), and also to a plurality of client devices 208(1)-208(n) via communication network(s) 210. A communication interface of the computing apparatus 202, such as the network interface 114 of the computer system 102 of FIG. 1, operatively couples and communicates between the computing apparatus 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used. The server devices 204(1)-204(n) and/or the client devices 208(1)-208(n) may provide different computing environments.

The communication network(s) 210 may be the same or similar to the network 122 as described with respect to FIG. 1, although the computing apparatus 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and computing apparatus that efficiently implement a method of the computer-automated detection of personally identifiable (PI) data in electronic data by detecting a presence of unmasked PI data between electronic data fields in different computing environments.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like.

The computing apparatus 202 may be a standalone device or integrated with one or more other devices or apparatuses, such as one or more of the server devices 204(1)-204(n), for example. In one particular example, the computing apparatus 202 may include or be hosted by one of the server devices 204(1)-204(n), and other arrangements are also possible. Moreover, one or more of the devices of the computing apparatus 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the computing apparatus 202 via the communication network(s) 210 according to the HTTP-based and/or JavaScript® Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store information that relates to PI data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the computing apparatus 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an embodiment, at least one client device 208 can be a wireless mobile communication device, i.e., a smart phone.

The client devices 208(1)-208(n) may run interface applications, such as standard web browsers or standalone client applications, which may provide an interface to communicate with the computing apparatus 202 via the communication network(s) 210 in order to communicate user requests and information. The client devices 208(1)-208(n) may further include, among other features, a display device, such as a display screen or touchscreen, and/or an input device, such as a keyboard, for example.

Although the network environment 200 with the computing apparatus 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems described herein are for example purposes, as many variations of the specific hardware and software used to implement the examples are possible, as will be appreciated by those skilled in the relevant art(s).

One or more of the devices depicted in the network environment 200, such as the computing apparatus 202, the server devices 204(1)-204(n), or the client devices 208(1)-208(n), for example, may be configured to operate as a virtual instance on the same physical machine. In other words, one or more of the computing apparatus 202, the server devices 204(1)-204(n), or the client devices 208(1)-208(n) may operate on the same physical device rather than as separate devices communicating through communication network(s) 210. Additionally, there may be more or fewer computing apparatus 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only tele-traffic in any suitable form (e.g., voice and modem), wireless traffic networks, cellular traffic networks, Packet Data Networks (PDNs), the Internet, intranets, and combinations thereof.

Figure 3:
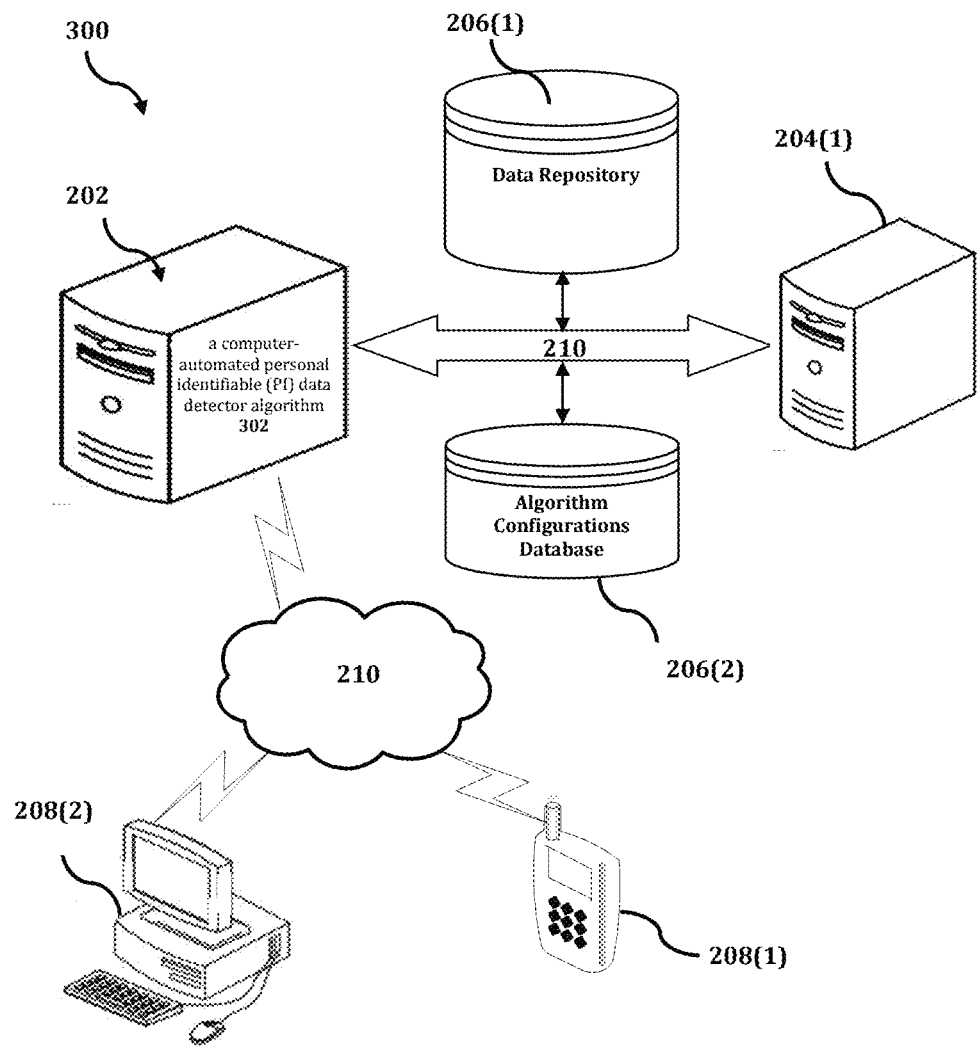
FIG. 3 illustrates a diagram of a system environment according to an embodiment for implementing a method of computer-automated detection of personally identifiable (PI) data in electronic data.

The computing apparatus 202 can be described and illustrated in FIG. 3 as including a computer-automated personally identifiable (PI) data detector algorithm 302, although it may include other rules, algorithms, policies, modules, databases, or applications, for example. As will be described below, the computer-automated PI data detector algorithm 302 can be configured to implement a method of the computer-automated detection of personally identifiable (PI) data in electronic data by detecting a presence of unmasked PI data between electronic data fields in different computing environments.

FIG. 3 illustrates a diagram of a system environment 300 for implementing a method for automating a process of computer-automated detection of personally identifiable (PI) data in electronic data by detecting a presence of unmasked PI data between electronic data fields in different computing environments by utilizing the network environment of FIG. 2, which may be illustrated as being executed in FIG. 3. Specifically, a first client device 208(1) and a second client device 208(2) are illustrated as being in communication with computing apparatus 202. In this regard, the first client device 208(1) and the second client device 208(2) may be "clients" of the computing apparatus 202 and are described herein as such. Nevertheless, it is to be known and understood that the first client device 208(1) and/or the second client device 208(2) need not necessarily be "clients" of the computing apparatus 202, or any entity described in association therewith herein. Any additional or alternative relationship may exist between either or both of the first client device 208(1) and the second client device 208(2) and the computing apparatus 202, or no relationship may exist.

Further, computing apparatus 202 may be illustrated as being able to access a data repository 206(1) and an algorithm configurations database 206(2). The computer-automated personally identifiable (PI) data detector algorithm 302 may be configured to access these databases for implementing a method of the computer-automated detection of personally identifiable (PI) data in electronic data by detecting a presence of unmasked PI data between electronic data fields in different computing environments.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an embodiment, either or both of the first client device 208(1) and the second client device 208(2) may communicate with the computing apparatus 202 via broadband or cellular communication. Of course, these embodiments are merely examples and are not limiting or exhaustive.

Upon being started, the computer-automated personally identifiable (PI) data detector algorithm 302 executes a process implementing a method of the computer-automated detection of personally identifiable (PI) data in electronic data that detects a presence of unmasked PI data between electronic data fields in different computing environments, i.e., detecting if there may be a breach between the barriers of different computing environment such that the presence of the PI data may be detected within unauthorized computing environments. A process for automating a process of the computer-automated detection of personally identifiable (PI) data in electronic data by detecting a presence of unmasked PI data between electronic data fields in different computing environments may be generally indicated at flowchart 400 in FIG. 4.

Figure 4:
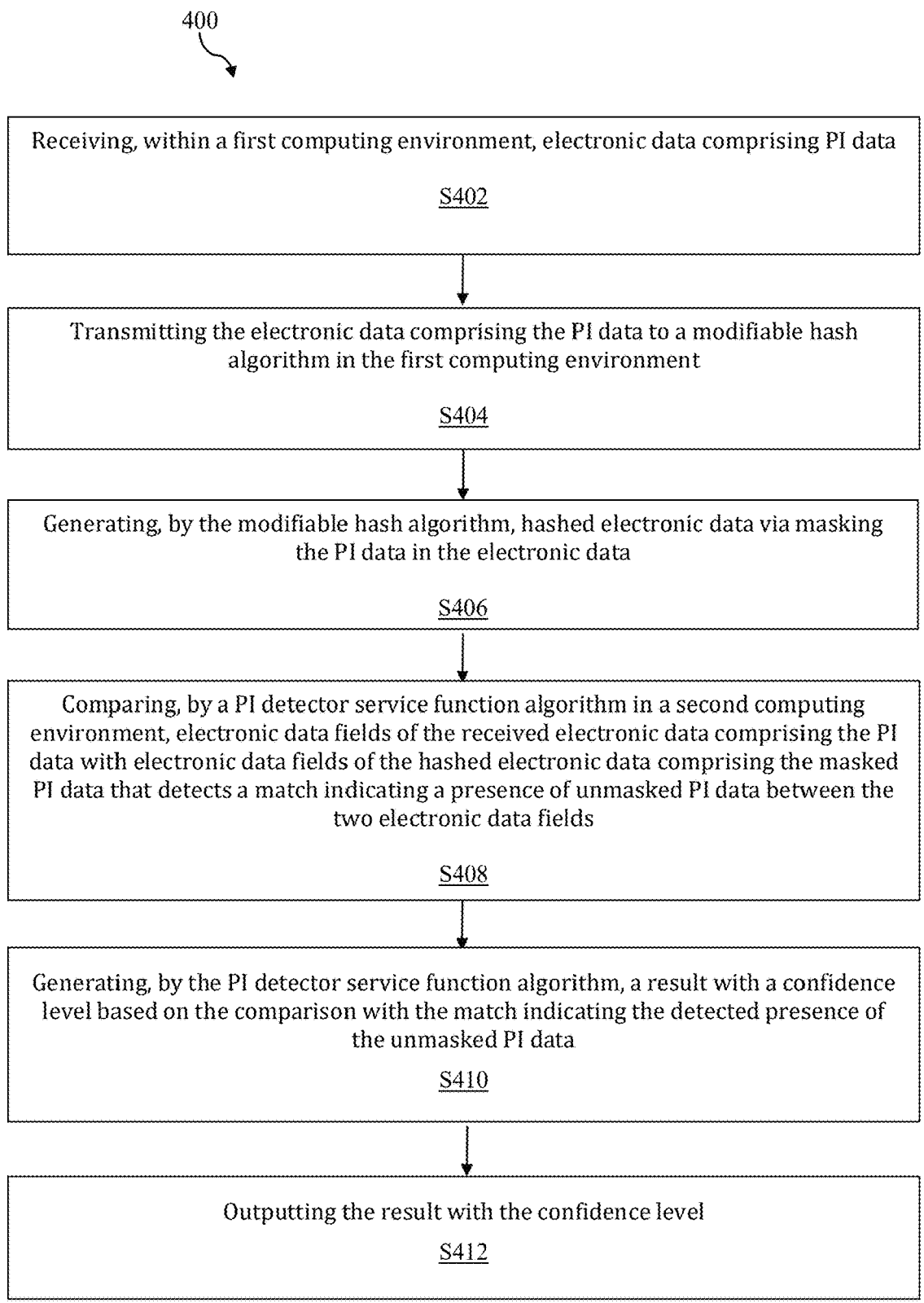
FIG. 4 illustrates a flowchart of a process diagram according to an embodiment for implementing a method of computer-automated detection of personally identifiable (PI) data in electronic data.

FIG. 4 illustrates a flowchart of a process diagram 400 of a process for implementing a method of computer-automated detection of personally identifiable (PI) data in electronic data according to an embodiment. At step S402 of the flowchart process 400, the computing apparatus 202 implementing computer-automated detection of PI data in electronic data may receive, within a first computing environment, electronic data comprising PI data. The first computing environment may denote a production computing environment. In an embodiment, the first computing environment may include, but not limited to, at least one from among: a computing environment of a branch of a financial institution (e.g., computing environment associated with a branch of a bank); a computing environment of a website associated with the financial institution (e.g., a bank's website); and a computing environment of a mobile application associated with the financial institution (e.g., a mobile application associated with the bank for mobile banking); etc.

Continuing with the flowchart process 400, the electronic data may include, but not limited to: consumer electronic data (e.g., electronic customer information); financial account origination data; financial account servicing data; financial account operational reporting data; financial account analytics reporting data; data from human resources containing PI data (e.g., employee PI data); etc. The electronic data used in flowchart process 400 may include tens of millions of electronic data worldwide associated with financial institution(s) that operate in tens of thousands of different computing environments running different program languages such as, but not limited to: UNIX®, SQL, JAVA®, MICROSOFT®.NET, PYTHON®, COBOL, LINUX®, etc.; and different types of databases including, but not limited to: ORACLE®, IBM® Database2 (DB2), mainframe, etc.

In an embodiment, the PI data may include at least one from among: a name, an address, a date of birth, a social security number, a tax identification, an email address, an account information, and a biometric data comprising at least one from among facial image scan and fingerprints. Whereby, in an embodiment, the account information may include at least of one from among: bank account, savings account, financial account, origination account, servicing account, operational reporting account, analytical account, loan account, money market account, credit card account, and investment account.

At step S404 of the flowchart process 400, the computing apparatus 202 implementing the computer-automated detection of the PI data may transmit the electronic data comprising the PI data to a modifiable hash algorithm in the first computing environment. The transmission may be performed via network 122 and/or connection network(s) 210.

At step S406 of the flowchart process 400, the modifiable hash algorithm may generate a hashed electronic data via masking the PI data in the electronic data. The modifiable hash algorithm may be a cryptographic secure hash algorithm (SHA) modifiable with various rules. In an embodiment, secure hash algorithm 256 (SHA 256) may be utilized as the modifiable secure hash algorithm, although other SHA algorithms may also be utilized as applicable. That is, the modifiable hash algorithm may not be limited to utilizing just SHA 256. The modifiable hash algorithm may be modifiable with rules associated with at least one from among: data conversion rules, data normalization rules, data transformation rules, data mapping rules, data translation rules, and data deletion rules. The various rules are described subsequently below. The modifiable hash algorithm may be modified by the various rules using the algorithm configurations database 206(2).

Still referring to step S406, the modifiable hash algorithm may be modified by the various rules in generating the hashed electronic data by: converting non-readable values in the electronic data comprising the PI data into spaces; deleting leading spaces and trailing spaces in the electronic data comprising the PI data; normalizing uppercase letters to lowercase letters in the electronic data comprising the PI data; converting mainframe format values in the electronic data comprising the PI data to standard encoding format values for electronic communication; compiling an electronic data file of the electronic data comprising the PI data based on the converting, deleting, normalizing, and converting; and transforming the compiled electronic data file of the electronic data comprising the PI data via the masking of the PI data in the electronic data with randomized text strings of characters, letters, and symbols, resulting in a one-way encryption of the PI data of the electronic data.

Still referring to step S406, the one-way encryption resulting from the generated hashed electronic data may be supported across different program languages such as, but not limited to: UNIX®, database SQL, JAVA®, MICROSOFT®.NET, PYTHON®, COBOL, LINUX®, etc.; and different types of databases including, but not limited to: ORACLE®, IBM® Database2 (DB2), mainframe, etc. An example of the generated hashed electronic data resulting in the one-way encryption is shown in FIG. 8.

Still referring to step S406, an embodiment of the mainframe format values may be Extended Binary Coded Decimal Interchange Code (EBCDIC) format values, although other mainframe format values can be utilized as applicable. Additionally, an embodiment of the standard encoding format values for electronic communication may be American Standard Code for Information Interchange (ASCII) format values, although other standard encoding format values can be utilized as applicable.

At step S408, a PI detector service function algorithm in the second computing environment may compare electronic data fields of the received electronic data comprising the PI data with electronic data fields of the hashed electronic data comprising the masked PI data that detects a match indicating a presence of unmasked PI data between the two electronic data fields. That is, the PI detector service function algorithm may analyze the two electronic data fields to make a comparison to detect a match indicating a presence of unmasked PI data between the two electronic data fields. The PI detector service function may include a comparator to perform this comparison. The second computing environment may denote a non-production computing environment. In an embodiment, the second computing environment may include, but not limited to, at least one from among: a developer test environment, a software test environment, and a shadow environment used for testing.

At step S410, the PI detector service function may generate a result with a confidence level based on the comparison with the match indicating the detected presence of the unmasked PI data. The confidence level can be a gauge related to the result indicating if there may be a match or not based on the comparison. For example, a confidence level that the result indicating if there may be a match or not based on the comparison may be at or above a majority value, 80%, 90%, or 95%, etc. While these values are given as examples, the confidence level may be not limited to these values and can be any such value as applicable.

At step S412, the result with the confidence level may be outputted. The result with the confidence level may be outputted for display using numeric values 0-99 and color indicators ranging from green to amber to red, with green denoting no match and no presence of the PI data breaching from the first computing environment (i.e., production computing environment) to the second computing environment (i.e., non-production computing environment), amber denoting caution of possible presence of the PI data breaching the computing environments, and red denoting presence of the PI data breaching the computing environments. Similarly, a value of 0 would denote no presence of the PI data breaching the computing environments, while a value of 100 would indicate presence of the PI data breaching the computing environments The numeric values and color indicators as described above are examples. Other values or indicators, etc. may also be used.

In a further embodiment, upon the outputting the result with the confidence level showing that the detecting of the match indicates the presence of the unmasked PI data between the two electronic data fields, the PI detector service function algorithm may automatically (and/or upon being prompted by the user) eliminate the presence of the unmasked PI data between the two electronic data fields via the masking of the unmasked PI data with the randomized text strings of characters, letters, and symbols. That is, actions may be undertaken to automatically eliminate any PI data that has been detected in an unauthorized computing environment, e.g., in a second computing environment comprising a non-production computing environment.

In a further embodiment, the result with the confidence level may be inputted into a data aggregator algorithm; and outputting, by the data aggregator algorithm, a report based on the result with the confidence level based on the comparison with the match indicating the detected presence of the unmasked PI data. Wherein the outputted report may be displayed on a user interface and the report may include at least one from among a generated event, a generated alert, a generated auto-remediation action, and a generated data set utilized in training an artificial intelligence (AI) model. The data aggregator algorithm may include at least one rule from among, but not limited to: PI rules, payment card industry rules, corporate information rules, California Consumer Privacy Act (CCPA) rules, General Data Protection Regulation (GDPR) rules, and data privacy rules.

Figure 5:
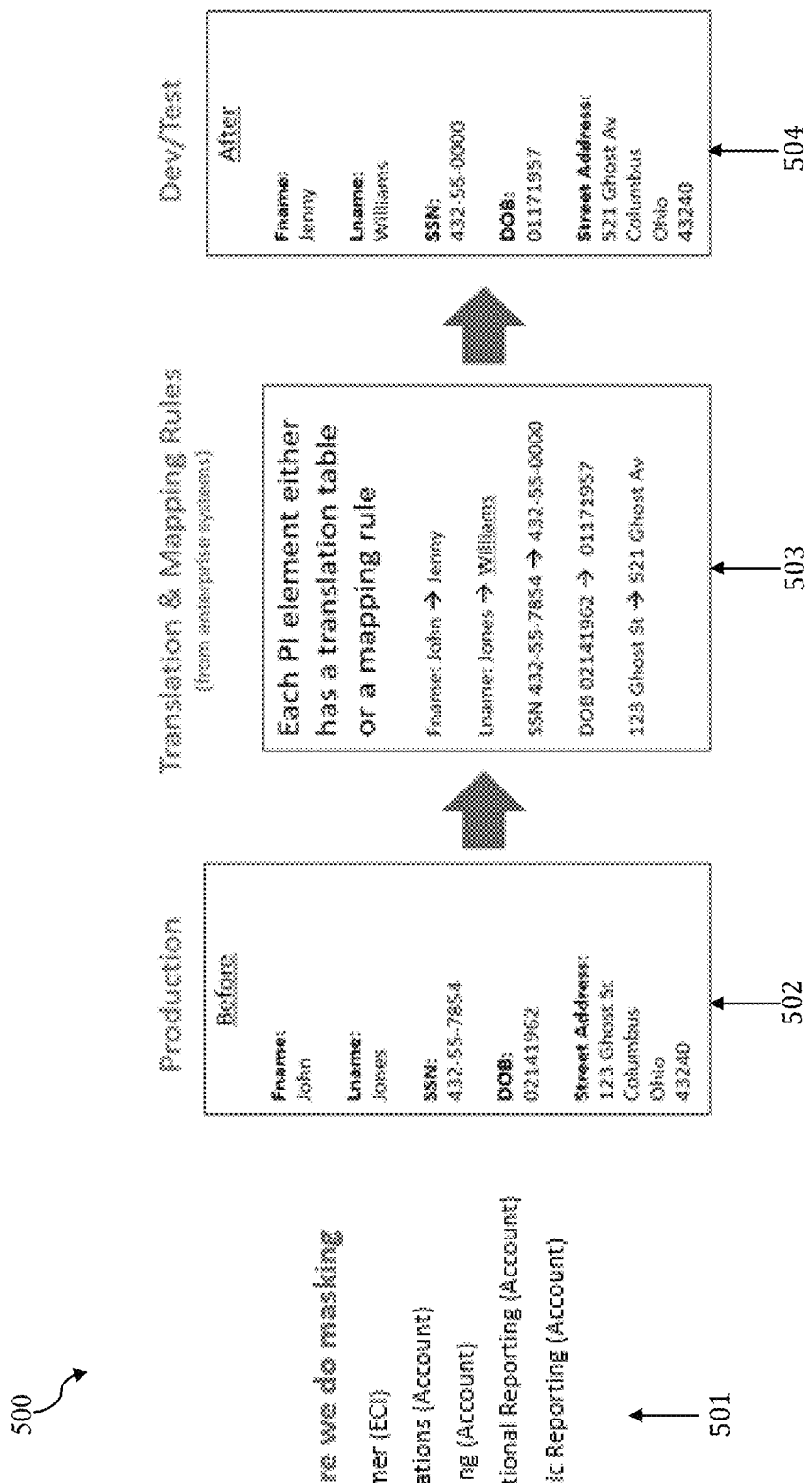
FIG. 5 shows a flowchart illustrating an example overview of the process of the computer-automated detection of PI data in electronic data in different computing environments that also depicts the different computing environments according to an embodiment.

FIG. 5 shows a flowchart 500 illustrating of an example overview of the process of the computer-automated detection of PI data in electronic data by detecting a presence of unmasked PI data between electronic data fields in different computing environments that also depicts the different computing environments (e.g., production and non-production computing environments).

FIG. 5 shows a non-exclusive list of PI data for masking 501, wherein the PI data such as the electronic data that can be masked comprises, but not limited to: consumer electronic data (e.g., electronic customer information); financial account origination data; financial account servicing data; financial account operational reporting data; financial account analytics reporting data; data from human resources containing PI data (e.g., employee PI data); etc.

The first graphic 502 of flowchart 500 shows the production environment according to an embodiment. The production environment may denote a first computing environment. Examples of the production computing environment may include, but are not limited to, at least one from among: a computing environment of a branch of a financial institution (e.g., computing environment associated with a branch of a bank), a computing environment of a website associated with the financial institution (e.g., a bank's website), and a computing environment of a mobile application associated with the financial institution (e.g., a mobile application associated with the bank for mobile banking), etc.

Continuing with the first graphic 502, it depicts an embodiment with the "before" graphic showing PI data for an example customer named John Jones, along with highly sensitive data about him such as his social security number (SSN), date of birth (DOB), and address. Such highly sensitive PI data should be masked.

Therefore, this PI data may be masked via a process as shown in the second graphic 503 of flowchart 500. This masking can be performable by e.g., a modifiable hash algorithm that may be modifiable with rules associated with at least one from among: data conversion rules, data normalization rules, data transformation rules, data mapping rules, data translation rules, and data deletion rules. The various rules are described subsequently below. The modifiable hash algorithm may be modified by the various rules using the algorithm configurations database 206(2).

In an embodiment, the modifiable hash algorithm may be modified by the various rules in generating the hashed electronic data by: converting non-readable values in the electronic data comprising the PI data into spaces; deleting leading spaces and trailing spaces in the electronic data comprising the PI data; normalizing uppercase letters to lowercase letters in the electronic data comprising the PI data; converting mainframe format values in the electronic data comprising the PI data to standard encoding format values for electronic communication; compiling an electronic data file of the electronic data comprising the PI data based on the converting, deleting, normalizing, and converting; and transforming the compiled electronic data file of the electronic data comprising the PI data via the masking of the PI data in the electronic data with randomized text strings of characters, letters, and symbols, resulting in a one-way encryption of the PI data of the electronic data.

In an embodiment, the masking may result in: the first name John may be changed to Jenny; the last name Jones may be changed to Williams; the SNN and DOB may be changed to different numeric values; and the street address may also be changed to a different street number and street name. Indeed, each element of the customer's PI data may be masked using the modifiable hash algorithm. Therefore, the customer's PI data may be modified such that it may no longer recognizable with the original PI data of the customer. That is, the customer's PI data has been masked.

In the third graphic 504 of flowchart 500, a developer/test computing environment is shown. That is, a second computing denoting a non-production computing environment may include, but not limited to: a developer test environment, a software test environment, or a shadow environment used for testing. Here, it can be seen in the "After" result of the masking that the highly sensitive PI data of the customer John Jones has been masked such that no original PI data of his remains in the aftermath of the masking.

Figure 6:
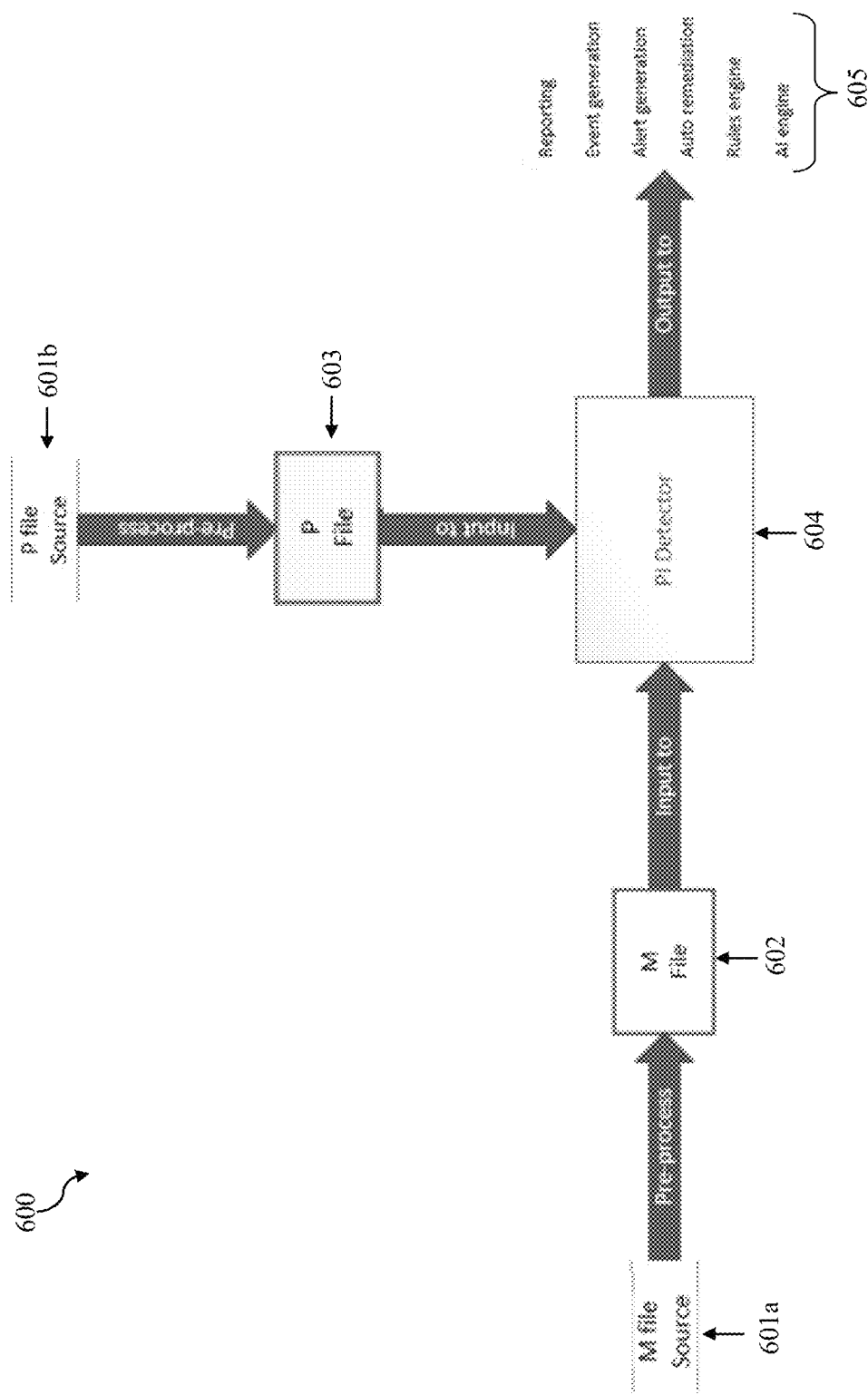
FIG. 6 shows an illustration of a high-level overview of the process of the computer-automated detection of PI data in electronic data, according to an embodiment.

FIG. 6 shows an illustration of a high-level overview 600 of the process of the computer-automated detection of PI data in electronic data according to an embodiment. The high-level overview 600 illustration shows data files 601*a* and 601*b* (e.g., masked (M) file sources 601*a* and production (P) file sources 601*b*) for processing to generate masked (M) files 602 or processed P files 603. Wherein P file sources may be derived from the production computing environment, i.e., first computing environment. The processed files may then inputted into the PI detector 604, i.e., the PI detector service function algorithm. The PI detector service function algorithm may perform operations as was previously described above. The PI detector service function algorithm may generate a result with a confidence level based on the comparison with the match indicating the detected presence of the unmasked PI data. In an embodiment, the result may be outputted 605 for reporting that may include, but not limited to: event generation or alert generation. In an embodiment, the result may also be outputted 605 for utilization, such as by a rules engine for modifying rules of the modifiable hash algorithm, for generating an auto-remediation action, or for generating a data set utilized in training an artificial intelligence (AI) engine/model. Although the phrase AI model is used, it is understood that the term model and engine in this context may be exchangeable and denote similar concepts. The outputted result such as the report may be displayed on a user interface for a user.

In an embodiment, the AI model including a reinforcement algorithm may be implemented, although other types of machine learning algorithm as applicable may also be implemented. The AI model may include the reinforcement learning that utilizes agent and reward function concepts. Wherein the agent may be the PI detector service function algorithm and the reward function may be related to the PI detector service function algorithm correctly generating a result that correctly detects the presence of unmasked PI data between electronic data fields in different computing environments with a sufficient accuracy level, e.g., at or above a predetermined accuracy level threshold. The predetermined accuracy level threshold may be any threshold value as applicable to sufficiently gauge the PI detector service function algorithm's operational performance in correctly generating a result that correctly detects the presence of unmasked PI data between electronic data fields in different computing environments, e.g., at or above a majority value, 80%, 85%, 90%, or 95%, etc. While these values are given as examples, the predetermined accuracy level threshold are not limited to these values and can be any threshold value as applicable.

The AI model may be trained with the electronic data comprising the PI data, the hashed electronic data comprising the masked PI data, the match detection indicating the presence of the unmasked PI data, the comparison of the electronic data fields of the received electronic data comprising the PI data with the electronic data fields of the hashed electronic data comprising the masked PI data for the match indicating the detected presence of the unmasked PI data between the two electronic data fields, and the result with the confidence level. The AI model may evaluate an operational performance of the PI detector service function algorithm in detecting the match indicating the presence of the unmasked PI data.

For instance, the AI model may evaluate: an accuracy of the results generated by the PI detector service function algorithm based on a predetermined accuracy level threshold; a computational efficiency of the PI detector service function algorithm in analyzing millions of electronic data and detecting a match indicating the presence of the unmasked PI data; etc. As previously explained, the AI model may include reinforcement learning that utilizes agent and reward function concepts. Wherein the agent may be the PI detector service function algorithm and the reward function may be related to the PI detector service function algorithm correctly generating a result that correctly detects the presence of unmasked PI data between electronic data fields in different computing environments with a sufficient accuracy level, e.g., at or above a predetermined accuracy level threshold. The predetermined accuracy level threshold may be any threshold value as applicable to sufficiently gauge the PI detector service function algorithm's operational performance in correctly generating a result that correctly detects the presence of unmasked PI data between electronic data fields in different computing environments, e.g., at or above a majority value, 80%, 85%, 90%, or 95%, etc. While these values are given as examples, the predetermined accuracy level threshold are not limited to these values and may be any threshold value as applicable.

The AI model may then update the operational performance of the PI detector service function algorithm in detecting the match indicating the detected presence of the unmasked PI data. For instance, the AI model may provide updates to the process by which the PI detector service function algorithm detects the presence of unmasked PI data between electronic data fields in different computing environments, the process of the PI detector service function algorithm being previously described.

In an embodiment, the generating the auto-remediation action may include eliminating, by the PI detector service function algorithm, the presence of the unmasked PI data between the two electronic data fields via the masking of the unmasked PI data with the randomized text strings of characters, letters, and symbols.

Figure 7:
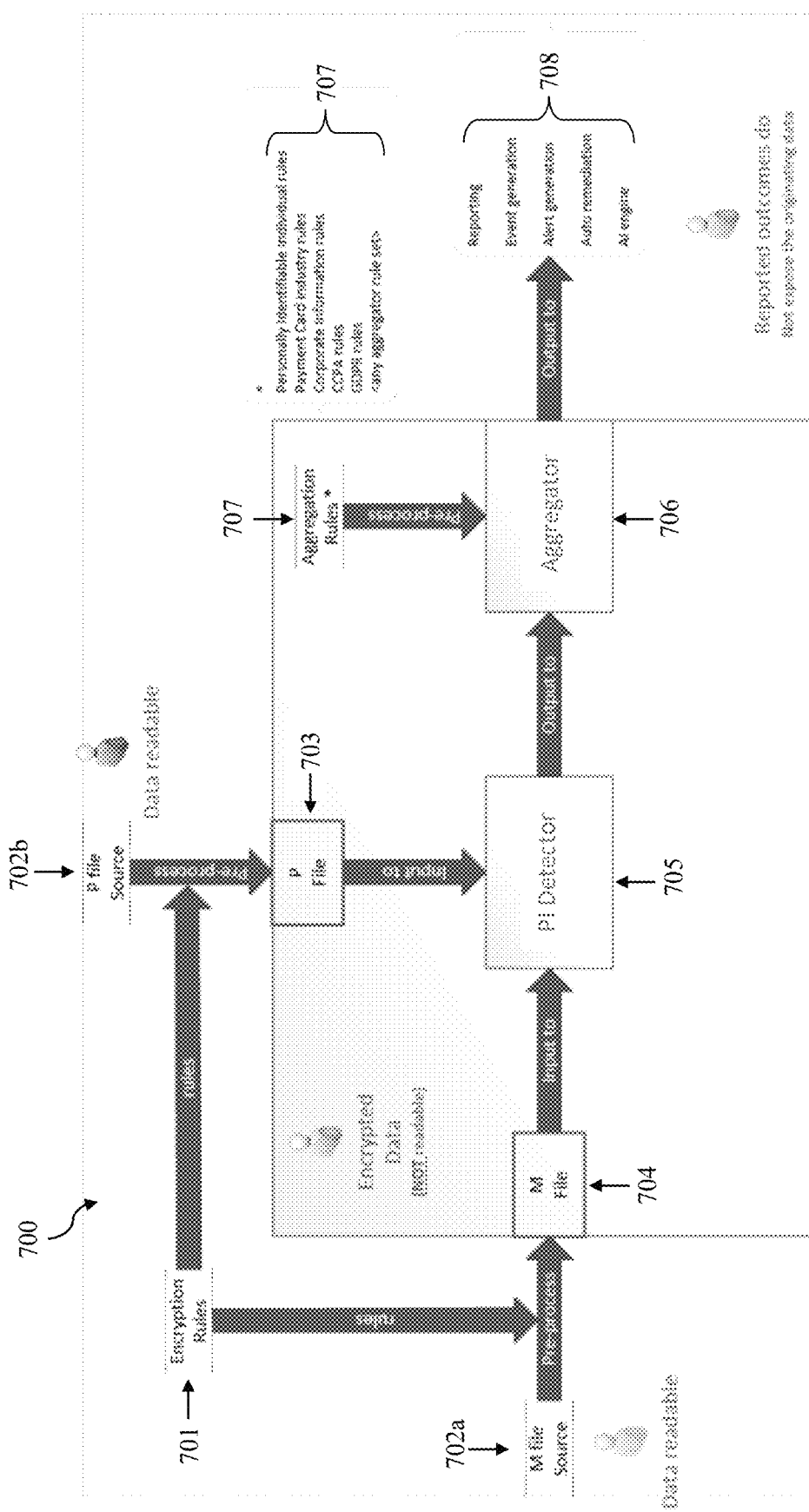
FIG. 7 shows an illustration of an in-depth level overview of the process of the computer-automated detection of PI data in electronic data according to an embodiment.

FIG. 7 shows an illustration of an in-depth level overview 700 of the process of the computer-automated detection of PI data in electronic data according to an embodiment. FIG.

7 expands upon the high-level overview 600 of the process of the computer-automated detection of PI data shown in FIG. 6. In FIG. 7, as is similar to FIG. 6, data files 702*a* and 702*b* (e.g., masked (M) file sources 702*a* and production (P) file sources 702*b*) may be processed to generate masked (M) files 704 or processed P source files 703. Prior to being processed, the PI data in the data files may be readable.

In FIG. 7, the in-depth level overview 700 illustration shows encryption rules 701 may be applied to data files (e.g., masked (M) file sources 702*a* and production (P) file sources 702*b*). The encryption rules 701 may be embodied by a modifiable hash algorithm including a cryptographic secure hash algorithm (SHA) modifiable with various rules. In an embodiment, secure hash algorithm 256 (SHA 256) may be utilized as the modifiable secure hash algorithm, although other SHA algorithms may also be utilized as applicable. That is, the modifiable hash algorithm need not be limited to utilizing just SHA 256. Wherein the modifiable hash algorithm may be modifiable with rules associated with at least one from among: data conversion rules, data normalization rules, data transformation rules, data mapping rules, data translation rules, and data deletion rules. The modifiable hash algorithm can be modified by the various rules using the algorithm configurations database 206(2).

The in-depth level overview 700 illustration shows data files 702*a* and 702*b* (e.g., M file sources 702*a* and P file sources 702*b*) for encryption processing to generate masked (M) files 704 or processed P files 703. Wherein P file sources may be derived from the production computing environment, i.e., first computing environment. The encryption being a one-way encryption of the PI data of the electronic data (e.g., the data files). That is, upon being encrypted via the processing, the PI data within the data files may no longer readable due to the one-way encryption. The encryption may be performed by the modifiable hash algorithm. The modifiable hash algorithm may be modified by the various rules in generating the hashed electronic data as was previously described, resulting in the encrypted data.

Continuing with FIG. 7, the processed files may then be inputted into the PI detector 705, i.e., the PI detector service function algorithm. The PI detector service function algorithm may perform operations as was previously described above. The PI detector service function algorithm may generate a result with a confidence level based on the comparison with the match indicating the detected presence of the unmasked PI data. In an embodiment, the result may be outputted to an aggregator 706, i.e., a data aggregator algorithm. That is, the resulting output may be inputted into the data aggregator algorithm. In an embodiment, the data aggregator algorithm may include at least one rule from among aggregation rules 707, such as, but not limited to: PI rules, payment card industry rules, corporate information rules, California Consumer Privacy Act (CCPA) rules, General Data Protection Regulation (GDPR) rules, and data privacy rules in processing the result.

Continuing with FIG. 7, the data aggregator algorithm may generate an output such as a report based on the result with the confidence level based on the comparison with the match indicating the detected presence of the unmasked PI data. That is, the result may be outputted 708 for reporting comprising, but not limited to, at least one from among: event generation and alert generation. In an embodiment, the result may also be outputted 708 for utilization by a rules engine for modifying rules of the modifiable hash algorithm, for generating an auto-remediation action, or for generating a data set utilized in training an artificial intelligence (AI) engine/model. Although the phrase AI model is used, it is understood that the term model and engine in this context may be exchangeable and denote similar concepts. The outputted result such as the report may be displayed on a user interface for a user. It is noted that the outputted result does not expose the PI data in the original data files because of the one-way encryption of the PI data.

In an embodiment, the AI model including a reinforcement algorithm may be implemented, although other types of machine learning algorithm can also be implemented. The AI model may be trained with the electronic data comprising the PI data, the hashed electronic data including the masked PI data, the match detection indicating the presence of the unmasked PI data, the comparison of the electronic data fields of the received electronic data including the PI data with the electronic data fields of the hashed electronic data including the masked PI data for the match indicating the detected presence of the unmasked PI data between the two electronic data fields, and the result with the confidence level. The AI model may evaluate an operational performance of the PI detector service function algorithm in detecting the match indicating the presence of the unmasked PI data. For instance, the AI model may evaluate: an accuracy of the results generated by the PI detector service function algorithm; a computational efficiency of the PI detector service function algorithm in analyzing millions of electronic data and detecting a match indicating the presence of the unmasked PI data; etc. The AI model may then update the operational performance of the PI detector service function algorithm in detecting the match indicating the detected presence of the unmasked PI data.

In an embodiment, the generating the auto-remediation action may include eliminating, by the PI detector service function algorithm, the presence of the unmasked PI data between the two electronic data fields via the masking of the unmasked PI data with the randomized text strings of characters, letters, and symbols.

FIG. 8 shows a sample hash file 800 according to an embodiment. The sample hash file 800 shows a result of the one-way encryption wherein the PI data within the electronic data has been hashed. The hashing may be performed by the modifiable hash algorithm, which may be a cryptographic secure hash algorithm (SHA) modifiable with rules associated with at least one from among: data conversion rules, data normalization rules, data transformation rules, data mapping rules, data translation rules, and data deletion rules. The modifiable hash algorithm may generate hashed electronic data, such as the sample hash file 800, by: converting non-readable values in the electronic data comprising the PI data into spaces; deleting leading spaces and trailing spaces in the electronic data comprising the PI data; normalizing uppercase letters to lowercase letters in the electronic data comprising the PI data; converting mainframe format values in the electronic data comprising the PI data to standard encoding format values for electronic communication; compiling an electronic data file of the electronic data comprising the PI data based on the converting, deleting, normalizing, and converting; and transforming the compiled electronic data file of the electronic data comprising the PI data via the masking of the PI data in the electronic data with randomized text strings of characters, letters, and symbols, resulting in a one-way encryption of the PI data of the electronic data.

Continuing with FIG. 8, the first column 801 of the sample hash file 800 shows a high-level identifier (e.g., a customer account number), wherein the high-level identifier may be tokenized and/or encrypted. The second column 802 of the sample hash file 800 shows a type of data, e.g., the acronym ACHM may denote automated clearing house data types and the acronym MF may denote mainframe data types from various mainframes such as mainframe 11, 17, etc. The third column 803 of the sample hash file 800 shows a data field descriptor, e.g., PRML-ADDR1 may denote the PI data containing a primary address of a customer. Similarly, the data field descriptor PRML-NAME may contain a customer's name. Similarly, the data field descriptor PRML-DOB may contain a customer's date of birth; the data field descriptor PRML-PHONE-BUS may contain a customer's business phone number; the data field descriptor PRML-PHONE-CELL may contain a customer's cell phone number; the data field descriptor PRML-PHONE-RES may contain a customer's residential phone number; etc. The other data field descriptors such as starting those starting with OC, 3C, and POFF, etc. may describe other types of data (e.g., account information data, etc.), wherein the field descriptors may automatically be generated by a computing system/apparatus or computing environment. Since the other data field descriptors may automatically be generated, the descriptors may include generic names comprising of letters and numbers, making it difficult to discern if data associated with these other data field descriptors contain PI data. As such, this is a reason that a process for computer-automated detection of PI data as disclosed herein is needed.

Continuing with FIG. 8, the fourth column 804 of the sample hash file 800 shows the resulting hashed data, wherein the PI data has been masked in the one-way encryption as performed by the modifiable hash algorithm with the modifiable rules. The first row in the fourth column 804 for data field descriptor TYP5-ACCT shows values comprising of 0s, 1s, 2, 3s, and 9s in a numeric data string. The numeric result in the fourth column 804 may denote that there was no data (including no PI data) present within this data field. That is, for the high-level identifier of 0010000494 with data type ACHM and with data field descriptor TYP5-ACCT, there was no data (i.e., empty or null data including empty or null PI data) for this data type within this data field descriptor for this customer associated with this high-level identifier. Similarly, the other fields with various numeric values in the fourth column 804 of the sample hash file 800 also denote no data (including no PI data) within the original electronic data.

Continuing with the fourth column 804 in FIG. 8, the second row in the fourth column 804 for data field descriptor PRML-ADDR1 shows a bunch of characters in a character string:}.Ö..Ð».©É¹",.2>§.ä(.µqÿA{X¶oV.o .... The character string result in the fourth column 804 may indicate that there was PI data present within this data field because the character string result may be a hash encryption of the PI data, i.e., the character string result showing the hashed electronic data masking the PI data. Thus, for the high-level identifier of 0010000494 with data type MF11 and with data field descriptor PRML-ADDR1, there was PI data for this data type within this data field descriptor for this customer associated with this high-level identifier. Whereupon the modifiable hash algorithm that may be modifiable by the various rules as described above performs a hashed one-way encryption of the PI data to generate the hashed electronic data masking the PI data originally present in the electronic file. Similarly, the other fields with various character strings in the fourth column 804 of the sample hash file 800 may also indicates the presence of PI data within the original electronic data and the various character strings denote hashed electronic data with the PI data masked.

Accordingly, with this technology, an optimized process may be provided for computer-automated detection of personally identifiable (PI) data in electronic data by detecting a presence of unmasked PI data between electronic data fields in different computing environments. The process for computer-automated detection of personally identifiable (PI) data may provide an advantageous improvement over the status quo by being optimized for operation across different computing environments running different program languages including, but not limited to: UNIX®, SQL, JAVA®, MICROSOFT®.NET, PYTHON®, COBOL, LINUX®, etc.; and different types of databases including, but not limited to: ORACLE®, IBM® Database2 (DB2), mainframe, client access license (CAL) systems, etc.

Additionally, the process for computer-automated detection of the PI data provides another advantageous improvement over the status quo by enabling standardization of masking PI data for one-way encryption via standardizing the generating of hashed electronic data that masks the PI data in the electronic data by the modifiable hash algorithm as previously described. In the status quo, it is difficult to fully mask certain PI data because geocoding needs valid street name, city, state, zip code, tax identifications, and/or date of birth values. The process as previously described of generating the hashed electronic data by the modifiable hash algorithm with modifiable rules enable a standardization of masking PI data across different situations, ensuring that the result are hashed electronic data with the PI data being masked. This also helps to standardize the modifiable rules across the different computing environments and operating platforms since the modifiable rules as recited in the present application are operable across the different computing environments and operating platforms, ensuring consistent, continuous, and standard operations across the different computing environments and operating platforms. Thus, helping to ensure computing efficiency across the different computing environments and operating platforms.

Furthermore, the process for computer-automated detection of the PI data provides another advantageous improvement over the status quo because at present, it can be difficult to verify that PI data was successfully masked because there are no automated checks or processes in place to do so that would operate across the different computing environments and operating platforms in a consistent, continuous, and standard manner, wherein operational rules are often viewed in isolation only within that particular computing environment or operating platform. In contrast to the status quo, the process for computer-automated detection of the PI data as described above provides advantageous improvements over the status quo through enabling: an automated process for one-way encryption of PI data; consistent, continuous, and standard operations across the different computing environments and operating platforms; and a fast and efficient manner to perform automated detection of PI data between different computing environments to detect if there may be a breach between the barriers of different computing environment such that the presence of the PI data may be detected within unauthorized computing environments, as well as automatically resolving and curing such detected breaches through e.g., auto-remediation actions.

Indeed, the process for computer-automated detection of the PI data as described above can be capable of being performed across tens of millions of electronic data worldwide associated with financial institution(s) that operate in tens of thousands of different computing environments running different program languages.

As such, it is all the more apparent and imperative of the need for the disclosed process and the advantageous improvement that the disclosed process provides over the status quo by enabling automated detection of PI data between different computing environments to detect if there may be a breach between the barriers of different computing environment such that the presence of the PI data may be detected within unauthorized computing environments. Although the disclosed process has been described via an embodiment of financial institutions, it can be applicable to any other applications where automated detection of PI data is needed. For instance, in hospitals, educational institutions, human resources services, tax services, etc.

Certainly, the need to protect PI data and detect any breaches of PI data in an unauthorized computing environment is extremely important. Various institutions and companies can incur detrimental consequences when PI data is not properly secure such as, but not limited to, high government fines when PI data is not properly secure, high damages from lawsuits, etc. Thus, there is a strong need for automated detection of whether there may be a breach between the barriers of different computing environment such that the presence of the PI data can be detected within unauthorized computing environments and to mask the PI data. The disclosed process provides solutions to these issues and provides advantageous improvements over the status quo, as was previously described.

Although the invention has been described with reference to several embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that can be capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure can be considered to include any computer-readable medium or other equivalents and successor media, in which data or instructions may be stored.

Although the present application describes specific embodiments which may be implemented as computer programs or code segments in computer-readable media, it can be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method of computer-automated detection of personally identifiable (PI) data in electronic data, the method being implemented by at least one processor, the method comprising:
    receiving, in a first computing environment, electronic data comprising PI data;
    transmitting the electronic data comprising the PI data to a modifiable hash algorithm in the first computing environment, wherein the modifiable hash algorithm comprises a cryptographic secure hash algorithm (SHA) being modifiable with rules associated with at least one from among: data conversion rules, data normalization rules, data transformation rules, data mapping rules, data translation rules, and data deletion rules;
    generating, by the modifiable hash algorithm, hashed electronic data via masking the PI data in the electronic data by:
        converting non-readable values in the electronic data comprising the PI data into spaces;
        deleting leading spaces and trailing spaces in the electronic data comprising the PI data;
    normalizing uppercase letters to lowercase letters in the electronic data comprising the PI data;
        converting mainframe format values in the electronic data comprising the PI data to standard encoding format values for electronic communication; compiling an electronic data file of the electronic data comprising the PI data based on the converting, deleting, normalizing, and converting, wherein the mainframe format values comprise Extended Binary Coded Decimal Interchange Code (EBCDIC) format values; and
        transforming the compiled electronic data file of the electronic data comprising the PI data via the masking of the PI data in the electronic data with randomized text strings of characters, letters, and symbols, resulting in a one-way encryption of the PI data of the electronic data;
    comparing, by a PI detector service function algorithm in a second computing environment, first electronic data fields of the received electronic data comprising the PI data with second electronic data fields of the hashed electronic data comprising the masked PI data in order to detect a match indicating a presence of unmasked PI data between the first and second electronic data fields;
    generating, by the PI detector service function algorithm, a result with a confidence level based on the comparison;
    outputting the result with the confidence level; and
    upon the outputting the result with the confidence level showing that the detecting of the match indicates the presence of the unmasked PI data between the first and second electronic data fields, eliminating, by the PI detector service function algorithm, the presence of the unmasked PI data between the first and second electronic data fields via the masking of the unmasked PI data with the randomized text strings of characters, letters, and symbols.

2. The method of claim 1, wherein the standard encoding format values for electronic communication comprises American Standard Code for Information Interchange (ASCII) format values.

3. The method of claim 1, wherein the PI data comprises at least one from among: a name, an address, a date of birth, a social security number, a tax identification, an email address, account information, and biometric data comprising at least one from among a facial image scan and fingerprints; and
    wherein the account information comprises at least one from among: a bank account number, a savings account number, a financial account number, an origination account number, a servicing account number, an operational reporting account number, an analytical account number, a loan account number, a money market account number, a credit card account number, and an investment account number.

4. The method of claim 1, wherein the first computing environment denotes a production computing environment comprising at least one from among: a computing environment of a branch of a financial institution, a computing environment of a website associated with the financial institution, and a computing environment of a mobile application associated with the financial institution; and
    wherein the second computing environment denotes a non-production computing environment comprising at least one from among a developer test environment and a software test environment.

5. The method of claim 1, further comprising:
    inputting the result into a data aggregator algorithm; and
    outputting, by the data aggregator algorithm, a report based on the result with the confidence level based on the comparison with the match indicating the detected presence of the unmasked PI data;
    wherein the outputted report is displayed on a user interface and the report comprises at least one from among a generated event, a generated alert, a generated auto-remediation action, and a generated data set utilized in training an artificial intelligence (AI) model.

6. The method of claim 5, wherein the data aggregator algorithm comprises at least one rule from among: PI rules, payment card industry rules, corporate information rules, California Consumer Privacy Act (CCPA) rules, General Data Protection Regulation (GDPR) rules, and data privacy rules.

7. The method of claim 1, further comprising:
    implementing an artificial intelligence (AI) model comprising a reinforcement algorithm;
    training the AI model with the electronic data comprising the PI data, the hashed electronic data comprising the masked PI data, the match detection indicating the presence of the unmasked PI data, the comparison of the first electronic data fields of the received electronic data comprising the PI data with the second electronic data fields of the hashed electronic data comprising the masked PI data, and the result with the confidence level;
    evaluating, by the trained AI model, an operational performance of the PI detector service function algorithm in detecting the match indicating the presence of the unmasked PI data; and
    updating, based on the trained AI model, the operational performance of the PI detector service function algorithm in detecting the match indicating the detected presence of the unmasked PI data.

8. A computing apparatus implementing a computer-automated detection of personally identifiable (PI) data in electronic data, comprising:
a processor;
a memory;
a display; and
a communication interface coupled to each of the processor, the memory, and the display, wherein the processor is configured to:
receive, within a first computing environment, electronic data comprising PI data;
transmit the electronic data comprising the PI data to a modifiable hash algorithm in the first computing environment, wherein the modifiable hash algorithm comprises a cryptographic secure hash algorithm (SHA) being modifiable with rules associated with at least one from among: data conversion rules, data normalization rules, data transformation rules, data mapping rules, data translation rules, and data deletion rules;
generate, by the modifiable hash algorithm, hashed electronic data via masking the PI data in the electronic data by:
converting non-readable values in the electronic data comprising the PI data into spaces;
deleting leading spaces and trailing spaces in the electronic data comprising the PI data;
normalizing uppercase letters to lowercase letters in the electronic data comprising the PI data;
converting mainframe format values in the electronic data comprising the PI data to standard encoding format values for electronic communication; compiling an electronic data file of the electronic data comprising the PI data based on the converting, deleting, normalizing, and converting, wherein the mainframe format values comprise Extended Binary Coded Decimal Interchange Code (EBCDIC) format values; and
transforming the compiled electronic data file of the electronic data comprising the PI data via the masking of the PI data in the electronic data with randomized text strings of characters, letters, and symbols, resulting in a one-way encryption of the PI data of the electronic data;
compare, by a PI detector service function algorithm in a second computing environment, first electronic data fields of the received electronic data comprising the PI data with second electronic data fields of the hashed electronic data comprising the masked PI data in order to detect a match indicating a presence of unmasked PI data between the first and second electronic data fields;
generate, by the PI detector service function algorithm, a result with a confidence level based on the comparison;
output the result with the confidence level; and
upon the outputting the result with the confidence level showing that the detecting of the match indicates the presence of the unmasked PI data between the first and second electronic data fields, eliminate, by the PI detector service function algorithm, the presence of the unmasked PI data between the first and second electronic data fields via the masking of the unmasked PI data with the randomized text strings of characters, letters, and symbols.

9. The computing apparatus of claim 8, wherein the processor is further configured to:
implement an artificial intelligence (AI) model comprising a reinforcement algorithm;
train the AI model with the electronic data comprising the PI data, the hashed electronic data comprising the masked PI data, the match detection indicating the presence of the unmasked PI data, the comparison of the first electronic data fields of the received electronic data comprising the PI data with the second electronic data fields of the hashed electronic data comprising the masked PI data, and the result with the confidence level;
evaluate, by the trained AI model, an operational performance of the PI detector service function algorithm in detecting the match indicating the presence of the unmasked PI data; and
update, based on the trained AI model, the operational performance of the PI detector service function algorithm in detecting the match indicating the detected presence of the unmasked PI data.

10. The computing apparatus of claim 8, wherein the processor is further configured to:
input the result into a data aggregator algorithm; and
output, by the data aggregator algorithm, a report based on the result with the confidence level of the comparison with the match indicating the detected presence of the unmasked PI data;
wherein the outputted report is displayed on a user interface and the report comprises at least one from among a generated event, a generated alert, a generated auto-remediation action, and a generated data set utilized in training an artificial intelligence (AI) model;
wherein the first computing environment denotes a production computing environment comprising at least one from among: a computing environment of a branch of a financial institution, a computing environment of a website associated with the financial institution, and a computing environment of a mobile application associated with the financial institution; and
wherein the second computing environment denotes a non-production computing environment comprising at least one from among a developer test environment and a software test environment.

11. A non-transitory computer readable storage medium storing instructions for computer-automated detection of personally identifiable (PI) data in electronic data, the non-transitory computer readable storage medium comprising executable code which, when executed by a processor, causes the processor to:
receive, within a first computing environment, electronic data comprising PI data;
transmit the electronic data comprising the PI data to a modifiable hash algorithm in the first computing environment, wherein the modifiable hash algorithm comprises a cryptographic secure hash algorithm (SHA) being modifiable with rules associated with at least one from among: data conversion rules, data normalization rules, data transformation rules, data mapping rules, data translation rules, and data deletion rules;
generate, by the modifiable hash algorithm, hashed electronic data via masking the PI data in the electronic data by:
converting non-readable values in the electronic data comprising the PI data into spaces;
deleting leading spaces and trailing spaces in the electronic data comprising the PI data;
normalizing uppercase letters to lowercase letters in the electronic data comprising the PI data;
converting mainframe format values in the electronic data comprising the PI data to standard encoding format values for electronic communication; compiling an electronic data file of the electronic data comprising the PI data based on the converting, deleting, normalizing, and converting, wherein the mainframe format values comprise Extended Binary Coded Decimal Interchange Code (EBCDIC) format values; and transforming the compiled electronic data file of the electronic data comprising the PI data via the masking of the PI data in the electronic data with randomized text strings of characters, letters, and symbols, resulting in a one-way encryption of the PI data of the electronic data;

compare, by a PI detector service function algorithm in a second computing environment, first electronic data fields of the received electronic data comprising the PI data with second electronic data fields of the hashed electronic data comprising the masked PI data in order to detect a match indicating a presence of unmasked PI data between the first and second electronic data fields;

generate, by the PI detector service function algorithm, a result with a confidence level based on the comparison;

output the result with the confidence level; and upon the outputting the result with the confidence level showing that the detecting of the match indicates the presence of the unmasked PI data between the first and second electronic data fields, eliminate, by the PI detector service function algorithm, the presence of the unmasked PI data between the first and second electronic data fields via the masking of the unmasked PI data with the randomized text strings of characters, letters, and symbols.

12. The non-transitory computer readable storage medium of claim 11, wherein the storage medium comprising the executable code which, when executed by the processor, causes the processor to further:

implement an artificial intelligence (AI) model comprising a reinforcement algorithm;

train the AI model with the electronic data comprising the PI data, the hashed electronic data comprising the masked PI data, the match detection indicating the presence of the unmasked PI data, the comparison of the first electronic data fields of the received electronic data comprising the PI data with the second electronic data fields of the hashed electronic data comprising the masked PI data, and the result with the confidence level;

evaluate, by the trained AI model, an operational performance of the PI detector service function algorithm in detecting the match indicating the presence of the unmasked PI data; and update, based on the trained AI model, the operational performance of the PI detector service function algorithm in detecting the match indicating the detected presence of the unmasked PI data.

13. The non-transitory computer readable storage medium of claim 11, wherein the storage medium comprising the executable code which, when executed by the processor, causes the processor to further:

input the result into a data aggregator algorithm; and output, by the data aggregator algorithm, a report based on the result with the confidence level of the comparison with the match indicating the detected presence of the unmasked PI data;

wherein the outputted report is displayed on a user interface and the report comprises at least one from among a generated event, a generated alert, a generated auto-remediation action, and a generated data set utilized in training an artificial intelligence (AI) model;

wherein the first computing environment denotes a production computing environment comprising at least one from among: a computing environment of a branch of a financial institution, a computing environment of a website associated with the financial institution, and a computing environment of a mobile application associated with the financial institution; and wherein the second computing environment denotes a non-production computing environment comprising at least one from among a developer test environment and a software test environment.

\* \* \* \* \*